United States Patent
Dahlin et al.

[11] Patent Number: 6,154,647
[45] Date of Patent: Nov. 28, 2000

[54] METHOD AND ARRANGEMENT FOR INCREASING THE RANGE FOR A TELECOMMUNICATION NETWORK IN A TELECOMMUNICATION SYSTEM

[75] Inventors: Jan Erik Åke Steinar Dahlin, Järfälla; Georg William Robin Chambert, Uppsala, both of Sweden

[73] Assignee: Telefonaktiebolaget LM Ericsson, Stockholm, Sweden

[21] Appl. No.: 08/793,149

[22] PCT Filed: Apr. 18, 1996

[86] PCT No.: PCT/SE96/00510

§ 371 Date: Apr. 16, 1997

§ 102(e) Date: Apr. 16, 1997

[87] PCT Pub. No.: WO96/34504

PCT Pub. Date: Oct. 31, 1996

[30] Foreign Application Priority Data

Apr. 24, 1995 [SE] Sweden .................................. 9501497

[51] Int. Cl.⁷ ...................................................... H04Q 7/20
[52] U.S. Cl. ........................... 455/426; 455/422; 455/552
[58] Field of Search ...................................... 455/445, 426, 455/422, 560, 561, 433, 509, 454, 458, 451, 552, 553, 466, 450; 370/522, 524, 328, 331, 338

[56] References Cited

U.S. PATENT DOCUMENTS

| | | | |
|---|---|---|---|
| 5,134,645 | 7/1992 | Berken et al. | 455/465 |
| 5,259,021 | 11/1993 | Antilla et al. | 455/465 |
| 5,303,286 | 4/1994 | Wiedeman . | |
| 5,469,496 | 11/1995 | Emery et al. | 455/461 |
| 5,509,053 | 4/1996 | Gowda et al. | 455/465 |
| 5,574,773 | 11/1996 | Grob et al. | 455/466 |
| 5,610,974 | 3/1997 | Lantto | 455/433 |
| 5,612,990 | 3/1997 | Meier et al. | 455/466 |
| 5,677,942 | 10/1997 | Meir | 370/277 |
| 5,721,762 | 2/1998 | Sood | 455/466 |
| 5,729,536 | 3/1998 | Doshi et al. | 370/398 |
| 5,742,905 | 4/1998 | Pepe et al. | 455/461 |
| 5,819,178 | 10/1998 | Cropper | 455/433 |
| 5,828,959 | 10/1998 | Soderbacka | 455/445 |
| 5,850,444 | 12/1998 | Rune | 380/21 |
| 5,862,481 | 1/1999 | Kulkarni et al. | 455/432 |
| 5,873,033 | 2/1999 | Hjern et al. | 455/417 |
| 5,878,343 | 3/1999 | Robert et al. | 455/424 |

*Primary Examiner*—Reinhard J. Eisenzopf
*Assistant Examiner*—Charles N. Appiah
*Attorney, Agent, or Firm*—Burns, Doane, Swecker & Mathis, L.L.P.

[57] ABSTRACT

A telecommunications system is disclosed for extending the range of at least two service networks having different specified signalling standards. The telecommunications system includes a radio-based access network which includes at least one port to each service network. The ports are connected to at least one base station in the access network. The access network also includes a radio-based access network part capable of connecting the base station to a radio unit in the access network. The radio unit is registered in one of the service networks, the so-called home network of the radio unit, and a signal carrier in the access network has a first terminal point in the radio unit and a second terminal point in a port which connects the access network with the home network. The port functions to combine the signal carrier in the access network with a signal carrier in the home network.

23 Claims, 8 Drawing Sheets

METHOD AND ARRANGEMENT FOR INCREASING THE RANGE FOR A TELECOMMUNICATION NETWORK IN A TELECOMMUNICATION SYSTEM

TECHNICAL FIELD

The present invention relates to an arrangement and to a method for increasing the range of at least two telecommunication networks, so called service networks having mutually different specified standards.

DESCRIPTION OF THE BACKGROUND ART

The increasing need for mobility in telecommunications systems requires the telephone network to cover larger geographical areas. A natural solution to increasing the geographical range of a telephone network is to expand the network. The expansion is optimized to suit the specified network standards. European Patent Application 0 602 857 discloses another solution for extending the range of a telephone network. The application illustrates how the services in a fixed telephone network can be reached transparently from a mobile unit located in a mobile telephone network. According to this publication, all outgoing calls from the mobile are first routed or directed to a program unit in the fixed telephone network. The call is then treated as though it had been setup from the program unit and access is given to the services of the fixed network. Another solution is disclosed in International Patent Application WO 94/13112, which illustrates a method of affording radio based access to a ground based telecommunications system. The aforesaid applications teach solutions for extending a telephone network having a specified signal standard, so as to cover a wider geographical area. If the solutions illustrated in these publications were to be applied to extend the coverage area of several networks that have mutually different specified standards, the total cost for each network proprietor would be far-reaching. U.S. Pat. No. 5,303,286 discloses a telecommunications system which includes PCN-system (Personal Communications Network) which has been integrated with a cellular network. The PCN-system is a part of the cellular network and when the PCN-system is heavily loaded certain frequencies in the cellular network can be allocated users in the PCN-system. The telecommunications system also includes a ground-based network part which is able to transfer signals from the PCN-user to the PCNsystem via the cellular network, such that the user of the PCN-system is perceived as being present in the PCN-network despite the cellular network being used in the radio access. The two systems can be reached from the cellular network. A common radio unit is used for access to both systems. The solution proposed in the US Patent Specification is complicated and fails to provide system flexibility and also requires a standard radio interface that has been specially adapted for the two systems that are included. The addition of further service networks having different types of specified signal standards would require further adaptations in addition to those already made and make the solution still more complicated.

SUMMARY OF THE INVENTION

The problem with extending the geographical coverage areas of several telecommunications networks that have mutually different specified standards reside in the costs that are entailed for the network proprietors in extending each individual network. Endeavours towards optimizing telecommunications networks, so-called service networks, has long constituted a mental obstacle to using a common telecommunications network for several telecommunications networks that have mutually different specified standards. A specified network standard is defined as the signalling protocol used by the network in communicating within said network, i.e. the "language" signalling nodes within the network are used to communicate with one another. Another problem encountered when extending the geographical coverage area of a network is the requirement of a common interface to subscribers in the common network. A common network subscriber may belong to both a ground-based service network and a radio-based service network. This problem is solved in accordance with the invention by connecting the service networks to a common radio-based universal network. The universal network includes an access network part and a transport network part. According to the invention there is first established when necessary a transparent signalling connection, a so-called signal carrier, through the access network between a radio unit in said access network and the service network to which the radio unit belongs, the so-called radio-unit home network. This enables communication between the radio unit and the home network to be effected with the same specified signalling standards as those used within the home network. The radio unit includes an access part which, via a radio connection with the access network, handles the establishment of the transparent connection to the home network through the access network. The radio unit also includes a service part that can transmit and receive the desired signalling messages via the transparent connection. In this regard, the service part receives and transmits signals with the same specified signalling standards as the standard used in the home network. Thus, according to the present invention there is first established a signal carrier through the access network, between the access part of the radio unit and the home network of said unit. Messages can then be transported transparently through the access network, via the signal carrier between the service part and the home network.

In signalling between the radio unit and the home network a transparent data carrier can be established through the earlier mentioned transport network upon request. Data can then be transmitted between the service part and the home network of the radio unit with the same transmission rate or speed as that used in the home network. Audio data (speech) and video data are examples of data information having different transmission rates in different service networks.

An object of the present invention is to extend the geographical range of different service networks.

This object can be achieved by using an access network which is common to service networks having different specified standards. The object can also be achieved by using a transport network which is common to service networks having different data transmission rates.

Another object of the invention is to enhance flexibility for users located in the universal network. This object is achieved in accordance with the invention by providing the access and transport networks with a radio transmission facility.

Another object of the invention is to establish a signal carrier through the access network, so as to enable a radio unit located in the access network and registered as a home subscriber in one of the service networks, the so-called home network, to communicate with the home network with the aid of the specified signalling standards of said home network.

Yet another object of the invention is to establish, when required, a data carrier through the transport network so as to enable the radio unit to transmit data with the specified data transmission rate of the home network.

One important advantage afforded by the invention resides in the enhancement of mobility and flexibility achieved with regard to subscribers belonging to the different service networks.

Another advantage afforded by the invention resides in the low costs entailed by the enhancement for increase in mobility and flexibility in comparison with the costs entailed by extending each service network per se.

The invention will now be described in more detail with reference to exemplifying embodiments thereof and also with reference to the accompanying drawings.

DESCRIPTION OF PREFERRED EMBODIMENTS

Figure 1:
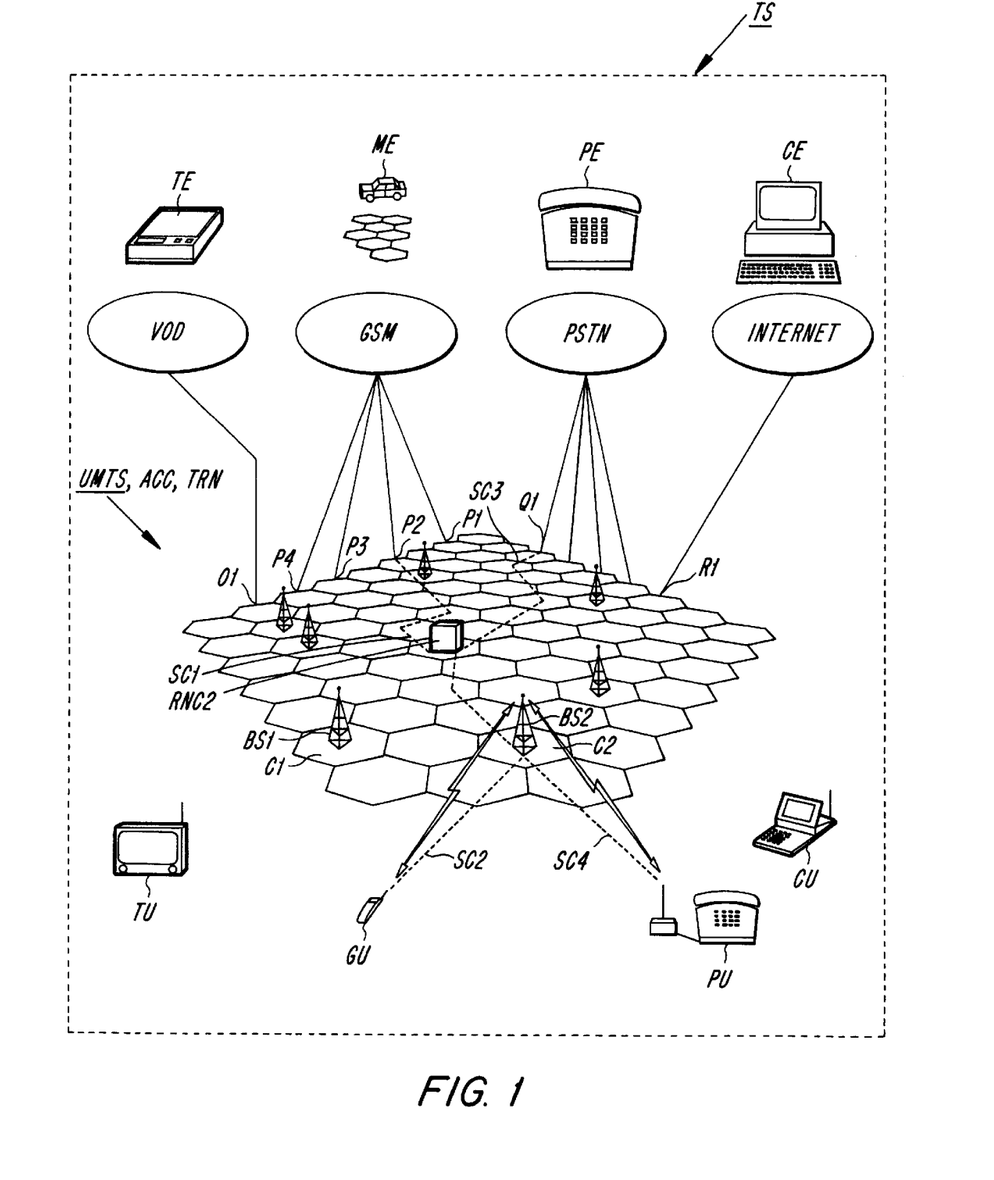
FIG. 1 is a perspective view of an access network connected to a plurality of service networks.

FIG. 1 illustrates a telecommunication system TS which includes a universal mobile telephone network UMTS. The universal mobile telephone network UMTS includes an access network ACC and a transport network TRN. Both the access network ACC and the transport network TRN are shown with common symbols in FIG. 1. The transport network TRN will be explained in more detail further on. The access network ACC includes a plurality of base stations BS1 and BS2 each covering with radio signals a geographical area, a so-called cell C1 and C2 respectively. FIG. 1 shows only a few of the base stations BS1, BS2 located in the access network ACC. The base stations BS1 and BS2 are connected to a radio control unit RNC2. The radio control unit RNC2 distributes signals to and from the connected base stations BS1, BS2. The telecommunications system TS in FIG. 1 includes a plurality of service networks VOD, GSM, PSTN and INTERNET. A service network VOD, which is a video network (Video on Demand), is used, for instance, by a video renting agency for transporting signals from a video film to the person renting the film, i.e. to said person's TV-equipment TE against payment. A service network GSM is a mobile telephone network used for transporting, e.g., speech signals to and from the mobile telephone equipment ME of a subscriber in the mobile telephone network. A service network PSTN is a public switched telephone network used to transport speech signals to a permanently connected telephone unit PE of a subscriber in the public telephone network. A service network INTERNET is used to transport electronic post to and from the computer equipment CE of a user of the post network. A specified network standard is defined by the signalling protocol used by the network in communicating within said network, i.e. the "language" signalling nodes are used within the network to communicate with each other. Examples of protocol are MAP and BSSAP, which are both used in the mobile telephone network GSM. The signalling protocols are well described in the specified standards of respective networks.

Each service network VOD, GSM, PSTN and INTERNET in the telecommunications system TS is connected to the access network ACC via at least one input port O1, P1, P2, P3, P4, Q1, R1. According to the illustrated embodiment, the radio control unit RNC2 in the access network ACC is connected to at least one of the input ports O1, P1, Q1, R1 to each service network. The telecommunications system TS includes radio units TU, GU, PU and CU which are located within the radio coverage area of the access network ACC. Each of the radio units TU, GU, PU, CU can establish a connection with each of the base stations BS1, BS2 in the access network ACC. Signal transport between one of the radio units and a selected service network takes place over so-called signal carriers. A signal carrier moves data transparently between two signalling nodes. Examples of different signalling nodes in the access network ACC are the input ports O1, P1, P2, P3, P4, Q1, R1, the radio control unit RNC2, the base stations BS1, BS2 and the radio units TU, GU, PU, CU.

A first signal carrier SC1 has been marked in FIG. 1 with a chain line between an input port P2 which is connected to a service network of the GSM-type and the radio control unit RNC2. A second signal carrier SC2 has been marked in FIG. 1 with a chain line between the radio control unit RNC2 and a portable radio unit GU, via base station BS2. The signal carriers SC1 and SC2 will be described in more detail further on. The radio units TU, GU, PU and CU include an access part and a service part. The access part belongs to the access network ACC and handles the signalling required to establish the second signal carrier SC2 between the radio unit GU and the radio control unit RNC2 in the access network ACC. The radio based part of the second signal carrier SC2 of the illustrated embodiment is comprised of a CDMA-based radio interface. This interface will be described in more detail further on. The service part belongs to one of the service networks VOD, GSM, PSTN or INTERNET and receives and transmits signals in accordance with the specified standards of the service network, via the established signal carriers SC1 and SC2. The access part and service part of the radio unit will be described in more detail further on.

Thus, in accordance with the invention there is established at least one signal carrier through the access network, between the radio unit and the home network of said unit. A message is thereafter transported transparently over the signal carrier through the access network between the service part and the home network of the radio unit.

Figure 2A:
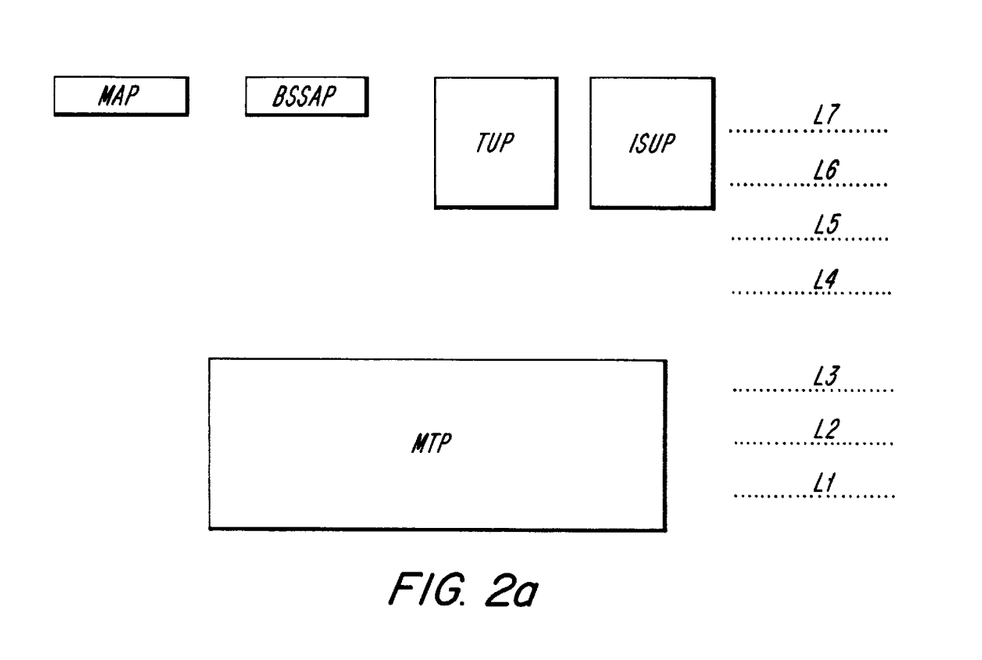
FIG. 2a and 2b illustrate schematically the principles of an OSI-model for No. 7 signalling.
Figure 2B:
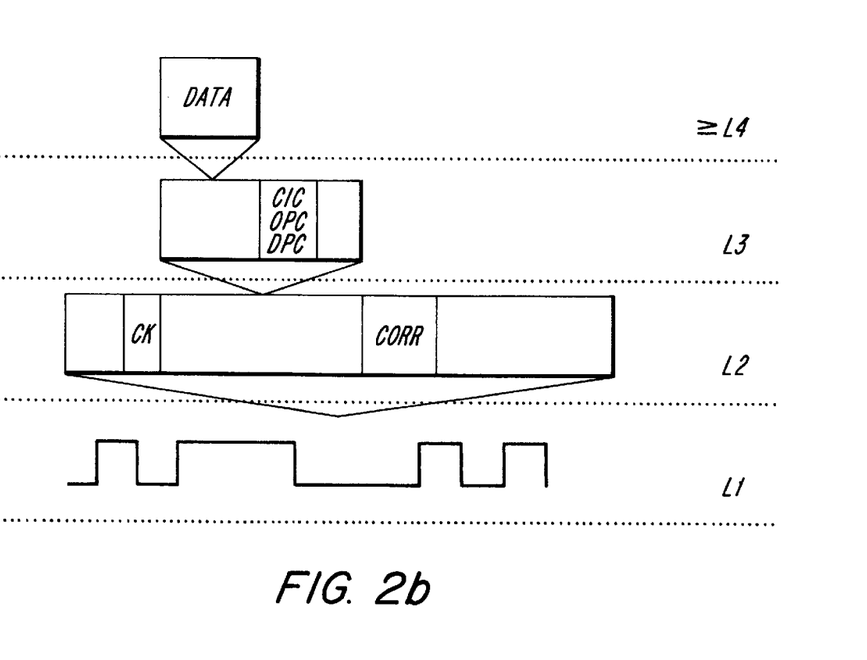

FIG. 2 illustrates an example of the construction of a signal carrier.

FIG. 2 illustrates a signal transport system of the type CCITT No. 7 Signalling System. Signalling according to the No. 7-system, so-called C7-signalling, is known to the art and is well described in CCITT Blue book Volume VI, recommendation Q.700. A brief description of the principles of C7-signalling is given below with the intention of enabling the invention to be better understood. The signal carrier includes a transport mechanism MTP which transports a message reliably between two designated signalling nodes. The message is "down packed" ? in an original node. The message is then transported on a physical link from the original node to a destination node, in which the message is "up-packed" ?. This down-packing, transportation and up-packing of the message is effected with the aid of the transport mechanism MTP, which will be described in more detail further on. The transport mechanism MTP is part of a C7-signal transport system and is represented by a so-called OSI-model, which is a standard model in network communication. The entire OSI-model is shown schematically in FIG. 2a and will be seen to comprise a total of seven layers L7–L1. The bottom three layers L3, L2, L1 correspond to the message transport part MTP mentioned above and explained in more detail with reference to FIG. 2b. The top four layers L7, L6, L5 and L4 correspond to the specified signalling standard of a service network. The aforesaid radio units TU, PU, RLL and CU are examples of units which generate messages in accordance with the standards of a service network. The deeper a layer is placed in the OSI-model, the more generally the layer can be used by a plurality of different service networks having different specified standards. On the other hand, the higher a layer is placed in the OSI-model, the more said layer is adapted specifically to a special service network. MAP (Mobile Application Part) and BSSAP (Base Station System Application Part), both intended for GSM, are examples of protocol which belong to the uppermost layer L7. Telephone user parts TUP (Telephone User Part) which generate messages for PSTN and which belong to the top two layers L6 and L7 are other examples of user protocol. The Figure shows a further example of protocol belonging to the uppermost layers, e.g. ISUP (Integrated Services Digital Network User Part) which generates messages intended for ISDN.

FIG. 2b shows the transport mechanism MTP, here represented by the three bottom layers L1, L2 and L3 in the OSI-model. A message DATA is generated in accordance with the specified signalling standard of a service network. The message DATA, which may be a MAP-type message, is delivered from an overlaying layer, marked with >=4 in the Figure, to the third layer L3. The third layer L3 is a network layer which distributes and directs the message DATA to the correct signalling node. The message DATA is placed in the third layer together with an original address OPC and a destination address DPC, among others. The content of the third layer L3 is delivered to the second layer L2. The second layer L2 is responsible for reliable transportation of the content of the third layer. The content of the third layer is placed in the second layer together with check sum CK and error correction bits Corr, among others. The content of the second layer L2 is then delivered to the first layer L1. The first layer L1 comprises hardware necessary for signalling transport. The first layer converts bit information from the second layer to pulses of correct size and shape. The pulses are transported to their correct destination, a physical signalling link. As beforementioned, this is achieved with the aid of the bottom layers L3, L2 and L1 as a transparent connection between a radio unit and a service network is established through the universal network. The signal carrier shown in FIG. 2 is only an example of conceivable signal carriers.

According to one embodiment, the aforesaid first signal carrier SC1 is established with the aid of another signal transport system which is an X.75-type Signalling System. Signalling according to the X.75-system is known to the art and is well described in CCITT Blue Book Volume VIII, recommendation X.75. The principles of the X.75-signalling system will be described briefly below with the intention of enabling the invention to be better understood. X.75-signalling includes a transport means with whose aid messages are transported between two signalling nodes. The transport means includes a packet layer, a link layer and physical layer. A message which is to be moved from a first signalling node to a second node is delivered to the packet layer. The packet layer converts the message to a format adapted for transportation within an X.75-based network. The content of the packet layer is delivered to the link layer. The link layer ensures reliable transport of the packeted message to the designated signalling node, by including a check sum and parity bits among others. The content of the link layer is then delivered to the physical layer. The physical layer includes hardware necessary for signal transport. The physical layer converts bit information from the second layer into electric pulses of the correct size and shape. The pulses are transported to their correct destination on a physical link. The layers thus form together a transport mechanism which transports the message reliably to a correct signalling node. In its most basic form, the message includes a plurality of binary characters whose mutual order has no significance to the transport mechanism. Since the content of the message is unimportant to the transport mechanism, messages that have been generated in networks having different signal standards can be transported with the aid of the transport mechanism. The content of the message is not important, or significant, until reaching those signal nodes that constitute terminal points, i.e. a node in which the message is created prior to being delivered to the signal carrier, or a node in which the message shall be read and processed after receipt from the signal carrier. The first signal carrier SC1 shown in FIG. 1 transports the GSM-messages transparently between the GSM-input port P2 and the radio control unit RNC2. It will be understood that the first signal carrier SC1 is only an example of a signal carrier through the access network ACC. Other types of signal carrier are conceivable, for instance signal carriers of the aforesaid type CCITT No. 7.

The second signal carrier SC2 shown in FIG. 1 between the radio control unit RNC2 and a radio unit GU is established with the aid of a logic channel especially dedicated for this purpose, between the radio control unit RNC2 and the radio unit GU. The dedicated channel is established on request from either the radio control unit RNC2 or the radio unit GU. Subsequent to the establishment of the dedicated channel, signal transport can be effected over said channel from either the radio control unit RNC2 to the radio unit GU or vice versa. The dedicated channel remains dedicated to signalling between the radio control unit and the radio unit until a release is requested. In the illustrated embodiment, the air based part of the second signal carrier SC2 between the radio unit GU and the base station BS2 is comprised of a CDMA-based radio interface. The ground based part of the second signal carrier SC2 is a signal carrier according to the X.25-system described in CCITT Blue Book Volume VIII, recommendation X.25. The aforesaid parts forming the second signal carrier SC2 are solely examples of conceivable signal carriers within the access network ACC.

Figure 3:
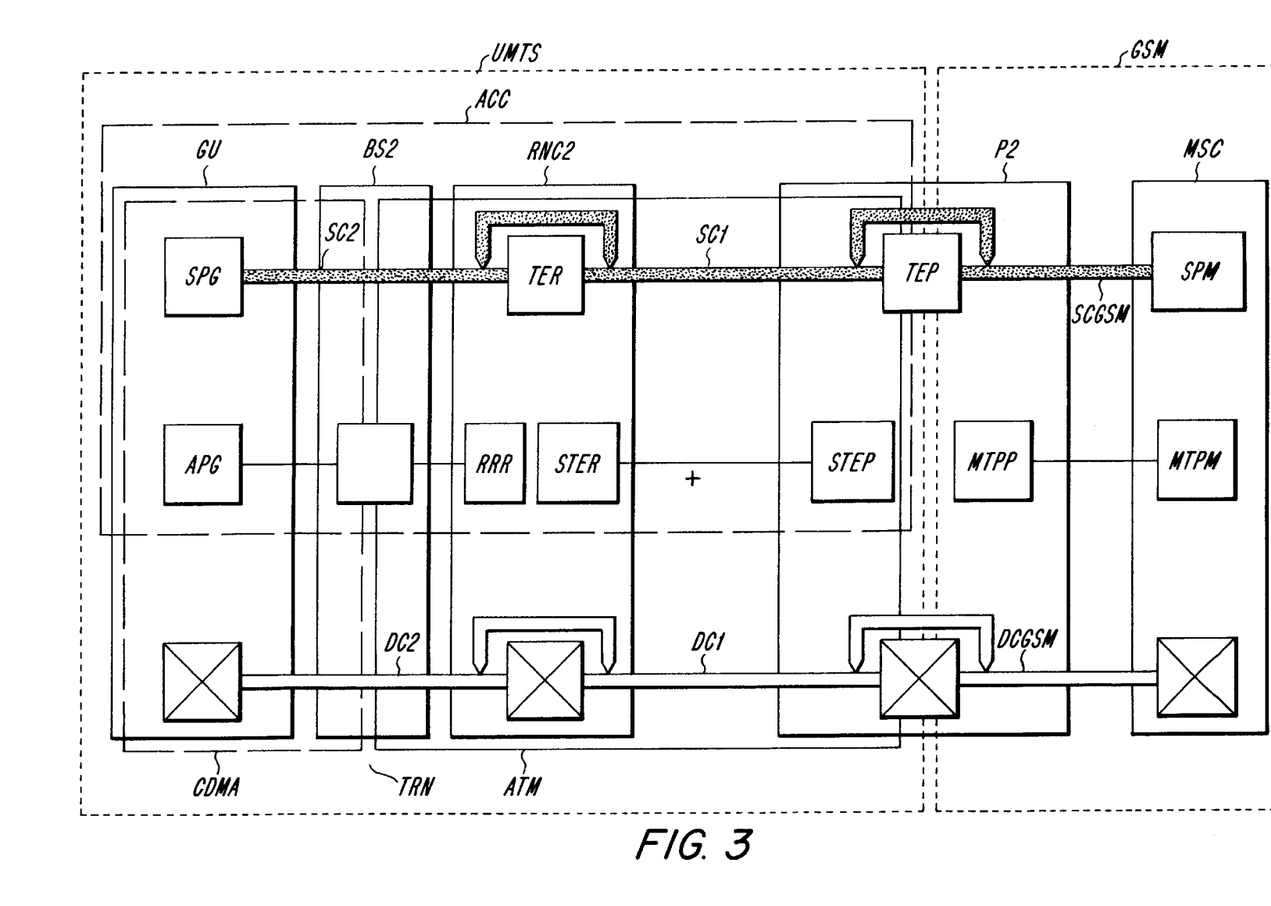
FIG. 3 is a block schematic of the telecommunication system, wherein signal and data carriers have been marked.

FIG. 3 is a block schematic in which the universal network UMTS earlier referred to with reference to FIG. 1 is connected to a GSM-type service network, a so-called GSM-network. The two networks UMTS and GSM are mutually connected via the input port P2. The access network ACC in the universal network includes the portable radio unit GU, the base station BS2, the radio control unit RNC2 and part of the input port P2. The radio unit GU is registered as a home unit in the GSM-network and is a so-called GSM-unit GU. The GSM-unit GU includes an access part APG and a service part SPG. The access part APG belongs to the access network ACC and handles the signalling necessary in establishing the earlier said signal carrier SC2 between the GSM-unit GU and the radio control unit RNC2. The earlier mentioned first signal carrier SC1 and the second signal carrier SC2 have been marked in FIG. 3 with solid thick lines between the GSM-unit GU, the radio control unit RNC2 and the input port P2. The service part SPG belongs to the GSM-network and transmits and receives signals in accordance with the specified standard of the GSM-network, via the first and the second signal carrier SC1 and SC2. The radio control unit RNC2 includes a radio resource unit RRR which, together with the access unit APG in the GSM-unit GU, establishes, maintains and releases the second signal carrier SC2 between the radio control unit RNC2 and the GSM-unit GU. The radio control unit RNC2 includes a signal terminal STER which, together with a signal terminal STEP in the input port P2, handles the establishment, maintainance and release of the first signal carrier SC1 between the radio control unit RNC2 and the input port P2. The signal terminals STER and STEP generate the aforesaid transport layers (packet, link and physical layers) in the X.75-system. The radio control unit RNC2 includes a transfer unit TER which moves the messages from the first established signal carrier SC1 to the second signal carrier SC2 and vice versa. The input port P2 also includes a transfer unit TEP, which moves the messages between the first established signal carrier SC1 and a GSM-signal carrier SCGSM that has been established in the GSM-network between the input port P2 and a mobile services switching centre MSC i the GSM-network. This transportation of the messages has been marked in FIG. 3 above the transfer unit TEP with a thick full line having pointed ends. This transfer of messages from one type of signal carrier to another type forms part of conventional telephony technology and is well described, e.g., in CCITT Blue Book Volume VIII, recommendation X.75. Briefly explained, "pointers" are stored in the transfer unit TEP when establishing the two signal carriers SC1 and SCGSM. When a message arrives from the first signal carrier SC1, the GSM-signal carrier SCGSM is pointed out. When a message arrives from the GSM-signal carrier SCGSM, the first signal carrier SC1 is pointed out. As earlier mentioned, the specified standard according to which a message is generated is unimportant to the signal carriers, provided that the signal carriers are solely responsible for transparent transportation or transfer of the message and transfer the message from one carrier to another upon arrival at a signalling node. The input port P2 includes a message transport unit MTPP which with the aid of No. 7-signalling handles the establishment, maintainance and release of the GSM-signal carrier SCGSM. The mobile switching centre MSC includes a message transport unit MTPM which, together with the transport unit MTPP of the input port P2, handles the GSM-signal carrier SCGSM. The mobile services switching centre MSC includes a signalling node SPM which generates a message according to a specified standard in the GSM-network. The aforesaid BSSAP-protocol is an example of one such standard. In the illustrated case, the signalling node SPM is a start-point or terminal-point in the GSM-network for the BSSAP-messages transported between the GSM-network and the GSM-unit GU. The service part SPG in the GSM-unit GU forms another start-point or terminal-point for the transport of BSSAP-messages. The BSSAP-message is transported in the GSM-network via the GSM-signal carrier SCGSM. With the aid of the transfer unit TEP in the input port, the BSSAP-message is transported from the GSM-signal carrier SCGSM to the first signal carrier SC1, which is of the X.75-type. The BSSAP-message is transported via the first signal carrier SC1 and is received in the radio control unit RNC2. After being received in the radio control unit, the BSSAP-message is transferred from the first signal carrier SC1 to the second signal carrier SC2, which includes a ground-based part of the X.25-type, with the aid of the transfer unit TER in the access network in the radio control unit. The message is transported from the radio control unit to the GSM-unit GU, via the base station BS2. The BSSAP-message is thus transported transparently from the mobile services switching centre MSC via the GSM-signal carrier through the access network to the GSM-unit GU, via the first signal carrier SC1 and the second signal carrier SC2. The various signalling procedures that are carried out when signalling through the access network between radio units TU, GU, PU, CU and their respective home networks VOD, GSM, PSTN, INTERNET will be explained in more detail further on with reference to different embodiments. The aforesaid signal carriers SC1, SC2 and SCGSM are well specified in those specifications earlier mentioned in the text. However, it will be readily understood by one skilled in this art that messages can be transported transparently through the access network with the aid of a different type of signal carrier, and that signals generated in accordance with different specified standards can be transported transparently via said signal carrier.

In addition to showing the access network ACC, FIG. 3 also shows the transport network TRN. Similar to the access network, the transport network TRN includes the GSM-unit GU, the base station BS2, the radio control unit RNC2 and a part of the input port P2. The transport network TRN includes a ground based part ATM between the input port P2 and the base station BS2, said part being an ATM-type in the illustrated case. The transport network TRN also includes an air carried part CDMA between the base station BS2 and the radio unit, which in the illustrated case is a CDMA-type. Data is transported via data carriers in the transport network TRN principly in the same manner as the aforedescribed signal transport. The transport network also includes devices corresponding to APG, RRR, STER, STEP, MTPP and MTPM as those described above as being necessary to establishing the signal carriers SC1, SC2 and SCGSM. These devices, however, have not been shown in FIG. 3. The ground based ATM-part includes a first data carrier DC1 between the input port P2 and the radio control unit RNC2, and a first part of a second data carrier DC2 between the radio control unit RNC2 and the base station BS2. As before mentioned, the second part of the second data carrier DC2 between the base station BS2 and the GSM-unit GU is air based and of the CDMA-type. Data carriers are marked with thick hollow lines in FIG. 3. The principle by which data is transferred from one data carrier to another is the same as that earlier described with reference to the transfer between different signal carriers. Pointers are stored in the transfer unit TEP at the same time as the data carrier DC1 and the GSM-data carrier DCGSM are established in the GSM-network. Upon the arrival of, e.g., a data packet from the first data carrier DC1, the pointers point to the GSM-signal carrier DCGSM, and upon the arrival of data from the GSM-signal carrier, the pointers point to the first data carrier. This transfer is well described in the B-ICI Specification of the ATM-forum (Version 1.0, September 1993).

The ATM-network enables data to be transferred at a required rate or speed. The ATM-network is known to the art and is well described in the B-ICI, AAL and UNI specifications of the ATM-forum. Similar to the ATM-network, the SDMA-network enables data to be transmitted at a variable transmission rate or speed. A report concerning a CDMA-network with variable data transmission rates has been filed for publication in the IEEE Journal of Selected Areas in Communication Special Issue on "CDMA Networks". The report discloses a CDMA-system having variable data transmission rates. In addition to the earlier mentioned dedicated channel specially dedicated for signalling between the GSM-unit GU and the base station BS2, a dedicated channel can also be allocated for transmitting data between the GSM-unit GU and the base station BS2. The ATM-network and the CDMA-network enable data to be transmitted within a wide spectrum. The two networks enable data to be transmitted between a wide frequency range, i.e. data transmission at varying rates. Example of carrier services of different transmission rates are:

* Narrow band: 0 to 64 Kbit/s.
* Medium band: 63 Kbit/s to 2 Mbit/s
* Wide band: 2 Mbit/s to 155 Mbit/s.

Examples of different data transmissions are:

Speech, which generally uses the narrow band.

Low speed data, which generally uses the medium band.

Lan, which generally uses the medium band.

Multi media mail, which generally uses the medium band.

Audio, which generally uses the medium band.

Video, which generally uses the medium band.

The ATM-network and the CDMA-network shall be seen only as examples of different networks with which the invention can be implemented.

Figure 4:
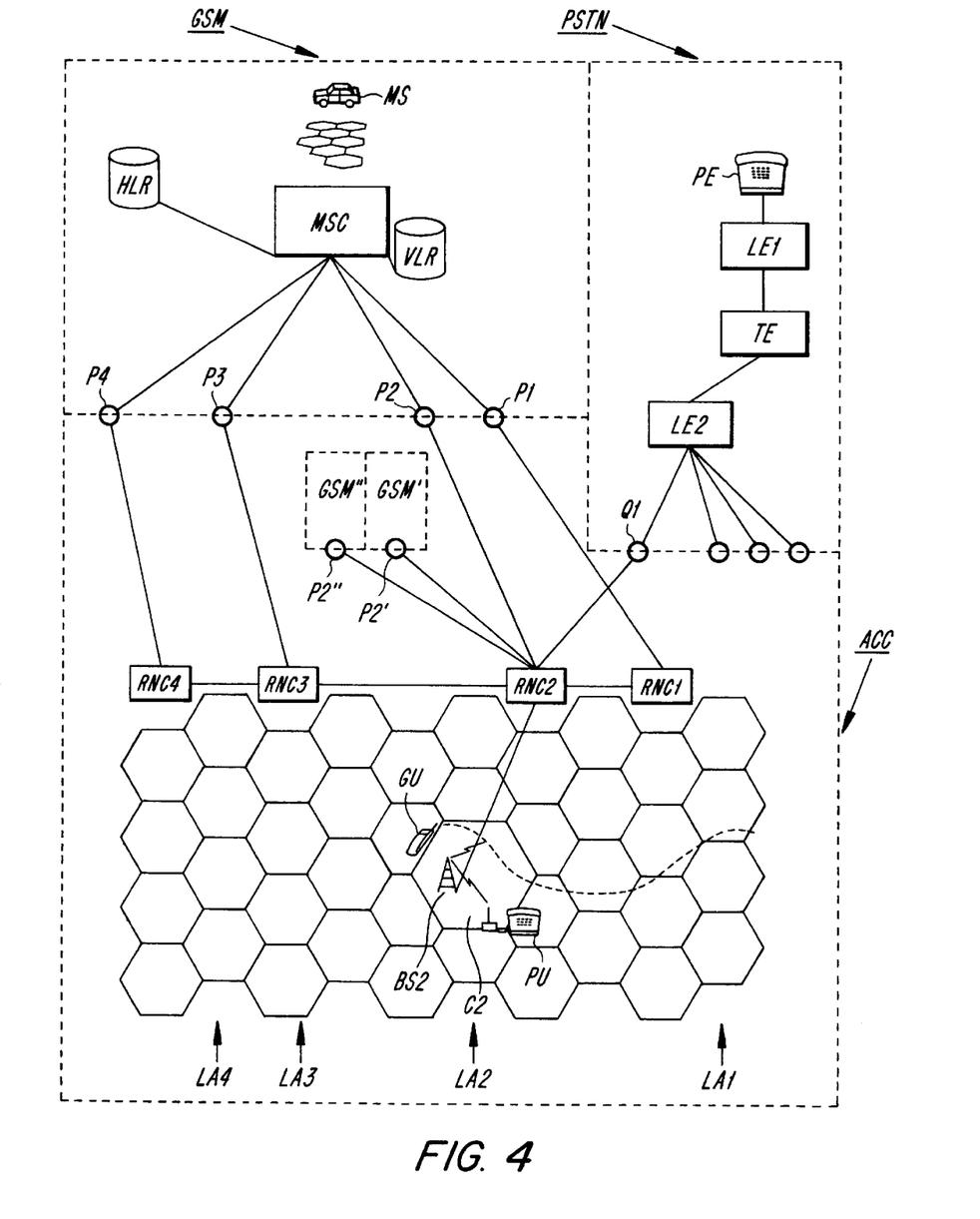
FIG. 4 is an overview of the access network connected to two service networks having different specified standards.

FIG. 4 illustrates the access network ACC earlier discussed with reference to FIGS. 1 and 3. The access network ACC includes location areas, so called search areas LA1, LA2, LA3 and LA4, each of which includes a plurality of cells. As before mentioned, the cells symbolize the radio coverage area of different base stations BS2. The limits between the different search areas LA1, LA2, LA3 and LA4 have been marked with thick full lines in the Figure, between the cell clusters in respective search areas. The base stations BS2 in each search area LA1, LA2, LA3 and LA4 are handles by one of the radio control units RNC1, RNC2, RNC3 and RNC4. As before mentioned, the portable radio unit GU in the access network is a so-called GSM-unit which is registered as belonging to the GSM-network. The GSM-network is thus the home network of the radio unit, a so-called GSM-home network. Another radio unit in the access network, a so-called PSTN-unit PU, is registered as belonging to a PSTN-type service network, the so-called PSTN-home network of the radio unit PU. The GSM-home network is connected to the access network ACC via the input ports P1, P2, P3 and P4 earlier mentioned with reference to FIG. 1. The Figure shows further ports P2' and P2". The further input ports belong to Operators (Proprietors) other than the operator handling the GSM-home network. Examples of Swedish GSM-Operators are TELIA, EUROPOLITAN and COMVIQ. Each Operator handles a service network GSM, GSM' and GSM" and each network is connected to the access network ACC via the ports P2, P2' and P2". Each port is connected to at least one of the radio control units RNC1, RNC2, RNC3 and RNC4. According to the illustrated embodiment, all ports P2, P2', P2" of said Operators are located at the same place and connect to the same radio control unit RNC2. The home network GSM includes a mobile services switching centre MSC and is connected to signalling nodes within the home network GSM. Examples of signalling nodes within the GSM-network are a home location register HLR and a visitor location register VLR. The mobile services switching centre is also connected to the input ports P1, P2, P3 and P4. The GSM-unit GU is registered permanently in the home location register HLR as belonging to the home network GSM. The GSM-unit GU may be registered temporarily in the visitor location register VLR as a visitor to one of the cells in the GSM-network handled by the mobile services switching centre MSC. According to the present invention, the GSM-unit may also be registered as a visitor in a cell in the access network ACC. The cell can be reached by the mobile switching centre MSC via one of the ports P1, P2, P3, P4. Information as to the port P1, P2, P3 or P4 in which the GSM-unit can be reached is stored in the visitor location register VLR. In order to be able to handle access to both the radio interface in the own home network GSM and the access network ACC it is necessary to have a mobile telephone unit which possesses a dual radio interface, a so-called dual-mode-unit. The dual-mode-unit enables the mobile telephone to choose a first radio interface that is used within the access network ACC and a second radio interface which is used within the home network GSM. The interface that is chosen will depend on in which of the two networks ACC, GSM the mobile is located. When the mobile moves from the access network ACC to the GSM-network, i.e. passes a cell boundary between the two networks ACC and GSM, registration is effected in the GSM-network in accordance with conventional GSM-techniques. When the mobile moves from the GSM-network GSM to the access network ACC this is registered in the access network in a manner described further on in the text. The aforementioned PSTN-unit PU is a permanently installed telephone unit in the access network ACC which communicates with its home network PSTN via a radio interface in the access network ACC. The PSTN-home network includes a first local exchange LE1, a second local exchange LE2 and a transit exchange TE. A telephone unit PE in the PSTN-network is connected to the first local exchange LE1. The transit exchange TE interconnects the two local exchanges LE1 and LE2. The second local exchange LE2 is connected to the access network via the input port Q1. The port Q1 is connected to the radio control unit RNC2. The signalling of the aforesaid radio units GU and PU to respective home network GSM and PSTN will now be described with reference to several method steps. It will be understood that the method does not lay claim to illustrating all steps required in the different signalling procedures. The order between the method steps may also vary. It is also pointed out that the construction of the access network can vary slightly. For instance, it is conceivable that each of the radio control units RNC1, RNC2, RNC3 and RNC4 belongs to said input ports P1, P2, P3 and P4.

Figure 5:
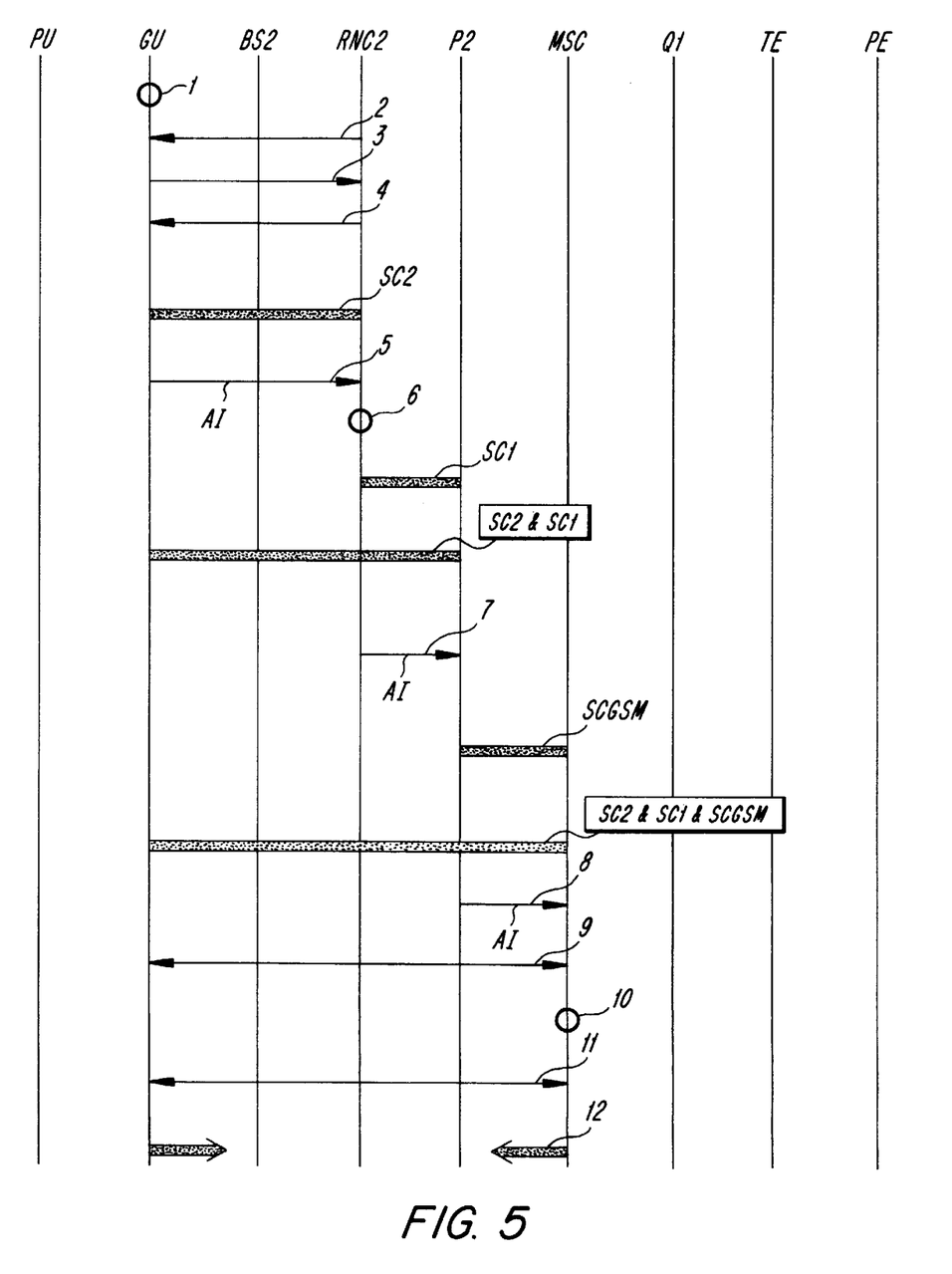
FIG. 5 illustrates signalling in one method of registering a radio unit that belongs to a GSM-network and which is located in the access network.

The method of registering the GSM-unit GU is illustrated in FIG. 5. For instance a GSM-unit may be registerede when the it passes from the GSM-network to the access network. Other examples are when the GSM-unit passes a search area or when the GSM-unit is activated. FIG. 5 shall be studied together with FIG. 4. The method is preceded by storing in the radio control unit RNC2 information disclosing which service network borders on the input ports to which the radio control unit is connected. The method includes the following steps:

The GSM-unit is activated. This is shown in FIG. 5 with a round thick ring 1.

A broadcast message 2 is sent to the GSM-unit GU from the radio control unit RNC2, via the base station BS2. The message 2 includes information necessary for the GSM-unit to understand that registration is necessary in order to keep the position of the GSM-unit updated in the GSM-home network. An example of information in the message 2 may be location area identities (LAID), channel description or power requirement for access to the access network ACC.

A "channel request" message 3 is sent to the radio control unit RNC2 from the GSM-unit GU via the base station BS2. The message includes a request for a channel that can be dedicated for signalling exclusively between the GSM-unit and the base station BS2, a so-called dedicated channel.

An accept message 4 is sent from the radio control unit RNC2 to the GSM-unit GU. The accept message 4 points out the dedicated channel. The dedicated channel is pointed out after choosing between possible available channels. The second signal carrier SC2 is established when the dedicated channel has been allocated signalling between the GSM-unit and the base station BS2. The signal carrier SC2 remains established until its release is requested. ?

An access message 5 is sent from the GSM-unit GU to the radio control unit RNC2, via the second signal carrier SC2. The access message 5 includes a subscriber identity AI denoting the user of the GSM-unit. The access message 5 also includes a service network identity which in the case of the illustrated embodiment is designated a first service network identity and which points out the GSM-service network that is the home network of the user.

The access message 5 is analyzed in the radio control unit RNC2 and the port P2 is pointed out at the input port to the GSM-home network with the aid of the earlier stored information. This has been marked in the Figure with a thick rouhnd ring 6.

The first signal carrier SC1, which is an X.75-type in the illustrated case is established between the radio control unit RNC2 and the input port P2 pointed-out, as earlier explained in the text. The first signal carrier SC1 is kept established until its release is requested.

The two established signal carriers SC1 and SC2 are mutually connected. This interconnection of the signal carriers enables messages from the second signal carrier SC2 to be delivered continuously to the first signal carrier SC1, and vice versa, provided that both signal carriers are established. The first and the second signal carriers SC1 and SC2 therewith form a common signal carrier as illustrated in the Figure with designation SC2&SC1.

The subscriber identity AI is forwarded from the radio control unit RNC2 to the input port P2 via the first signal carrier SC1, as shown by arrow 7.

The GSM-signal carrier SCGSM is established between the input port P2 and the mobile services switching centre MSC in accordance with the transport system used in the home network GSM. According to the illustrated example, the GSM-signal carrier SCGSM is a No. 7-type and is established in accordance with the specification earlier indicated in the text. The GSM-signal carrier SCGSM remains established until its release is requested.

The established signal carriers SC1&SC2 and SCGSM are interconnected. This interconnection enables the messages from the GSM-signal carrier SCGSM in the GSM-network to be delivered continuously to the signal carriers SC1&SC2 in the access network, and vice versa, provided that all signal carriers are established. This message delivery has been explained in the aforegoing. The first signal carrier SC1, the second signal carrier SC2 and the GSM-signal carrier SCGSM therewith form a common signal carrier designated SC2&SC1&SCGSM in the Figure.

The subscriber identity is forwarded from the input port P2 to the mobile switching centre MSC, as indicated with arrow 8.

Signalling necessary for authorization checks is sent in both directions over signal carriers SC1, SC2 and SCGSM between the service part SPG in the GSM-unit GU and the home network GSM. Signalling is effected in accordance with the specified standard of the home network GSM and is shown in the Figure with a double-headed arrow 9.

The subscriber is accepted as belonging in the home network GSM and the subscriber identity AI is stored in the visitor location register in the mobile switching centre together with data relating to the input port P2. This data storage has been marked with a round ring 10 in FIG. 5.

A request 11 for the release of the signal carriers is made in conjunction with termination of the signalling process.

The established signal carriers SC1, SC2 and SCGSM are released. This release has been shown in FIG. 5 with two thick solid arrows 12.

Figure 6:
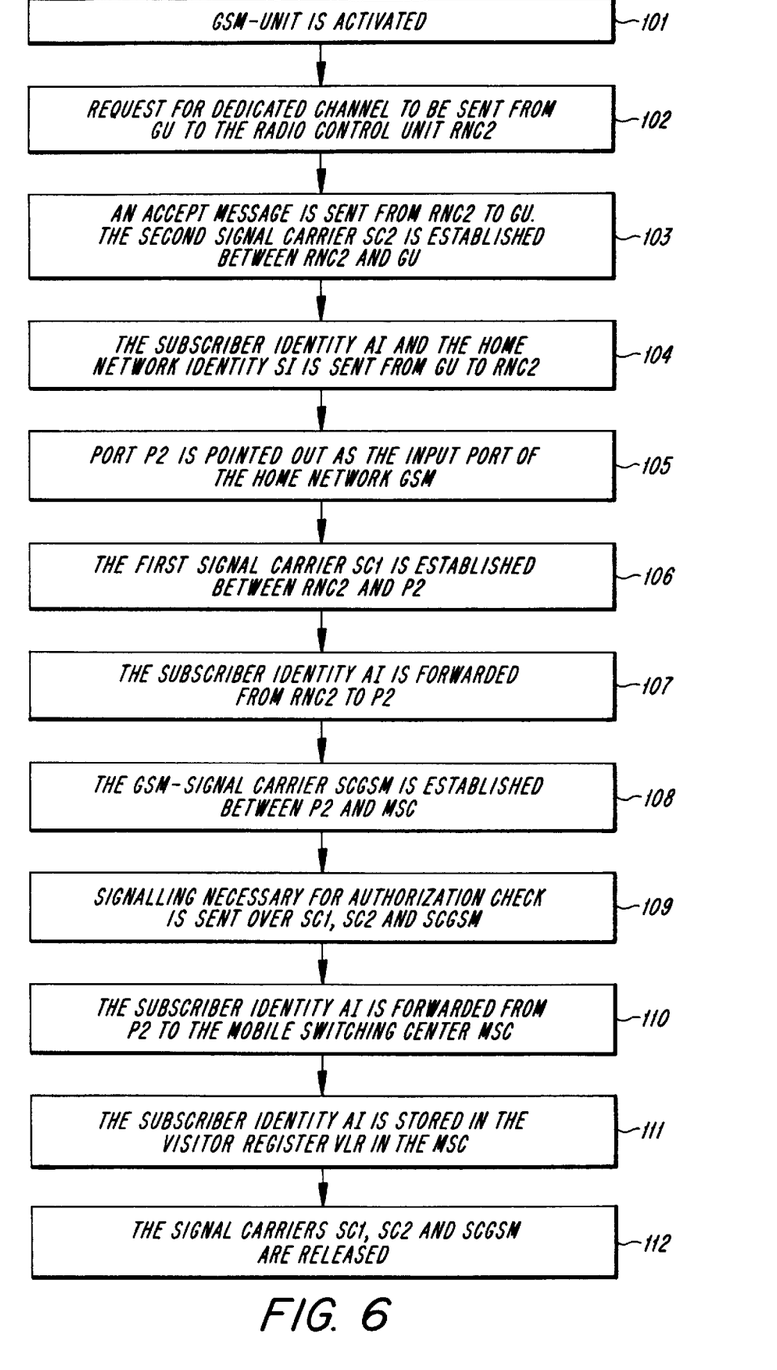
FIG. 6 is a flow sheet illustrating the signalling shown in FIG. 5.

FIG. 6 is a flow sheet which describes briefly the most important steps in the earlier described procedure. FIG. 6 shall be read together with FIGS. 4 and 5. The flow sheet of FIG. 6 illustrates the following steps:

The GSM-unit is activated. This is shown in FIG. 6 with a block 101.

The channel request message 3 is sent from the GSM-unit GU to the radio control unit RNC2 via the base station BS2, in accordance with block 102. The message includes the request for a channel that can be allocated signalling exclusively between the GSM-unit and the base station BS2, a so-called dedicated channel.

An accept message 4 is sent from the radio control unit RNC2 to the GSM-unit GU, in accordance with block 103. The accept message 4 points out the dedicated channel. The dedicated channel is pointed out after choosing between possible available channels. The second signal carrier SC2 is established when the dedicated channel has been allocated signalling between the GSM-unit and the base station BS2.

The access message 5 is sent from the GSM-unit GU to the radio control unit RNC2 via the second signal carrier SC2, in accordance with block 104. The access message 5 includes the subscriber identity AI which denotes the user of the GSM-unit. The access message 5 also includes the first service network identity that points out the GSM-service network as the home network of the user.

The access message 5 is analyzed in the radio control unit RNC2 and the port P2 is pointed out as the input port to the GSM-home network. This has been marked in the Figure with a block 105.

The first signal carrier SC1 is established between the radio control unit RNC2 and the input port P2 pointed out, in accordance with block 106.

The subscriber identity AI is forwarded from the radio control unit RNC2 to the input port P2 by the first signal carrier SC1, in accordance with block 107.

The GSM-signal carrier SCGSM is established between the input port P2 and the mobile services switching centre MSC, in accordance with block 108.

Signalling necessary for authorization checks is sent between the service part SPG in the GSM-unit GU and the home network GSM, according to block 109.

The subscriber identity AI is forwarded from the input port P2 to the mobile switching centre MSC, according to block 110.

The subscriber identity AI is stored in the visitor location register VLR in the mobile switching centre, together with data relating to the input port P2. This storage of data has been marked in FIG. 6 with a block 111.

The established signal carriers SC1, SC2 and SCGSM are released. This carrier release is shown in FIG. 6 with a block 112.

The activity illustrated in the above signalling example with reference to FIGS. 4–6 is the registration of the GSM-unit, although other activities are conceivable that have their origin in the GSM-unit GU, for instance the setup of call connections or other types of service request. It is necessary to establish different signal carriers SC1 and SC2 in order to perform the activity. Transparent signalling is effected through the access network, subsequent to having established the signal carriers. In this regard, the GSM-unit is perceived by the home network GSM as being a radio unit that is located within the GSM-home network. It will be described in the following how the PSTN-unit PU located in the access network ACC and using a standard signalling protocol other than the GSM-protocol BSSAP and which has a home network different to the GSM-home network is perceived as being a radio unit within its home network, i.e. within the PSTN-home network.

It is shown in the following example how a call connection is set up from an A-subscriber in the PSTN-network to a B-subscriber in the access network ACC. After a call connection has been established, speech signals are transported via the data transport network TRN. In the present case, the transport network is partly of the ATM-type (Asynchronus Transfer Mode) and partly of the CDMA-type, which was previously mentioned with reference to FIG. 3. When the PSTN-unit is installed in the access network ACC, the unit is registered as being permanently present in either the cell that is handled by the base station BS2 or in one of the six cells surrounding the cell 2. The PSTN-unit is registered in the PSTN-network with a telephone number of the same type as remaining subscribers in the PSTN-network. When registering the PSTN-unit, the input port Q1 is given as the port through which the radio unit can be reached. Changes in the radio space can cause the PSTN-unit as being perceived to be located in one of the peripheral cells. The PSTN-unit is therefore registered in the radio control unit RNC2 as being potentially present in one of those cells that surround the cell C2 handled by the base station BS2. In FIG. 4, the cell C2 has been shown somewhat larger than the peripheral cells. The PSTN-unit may thus be located in either the cell handled by the base station BS2, or in one of the six cells that surround the cell C2.

Figure 7:
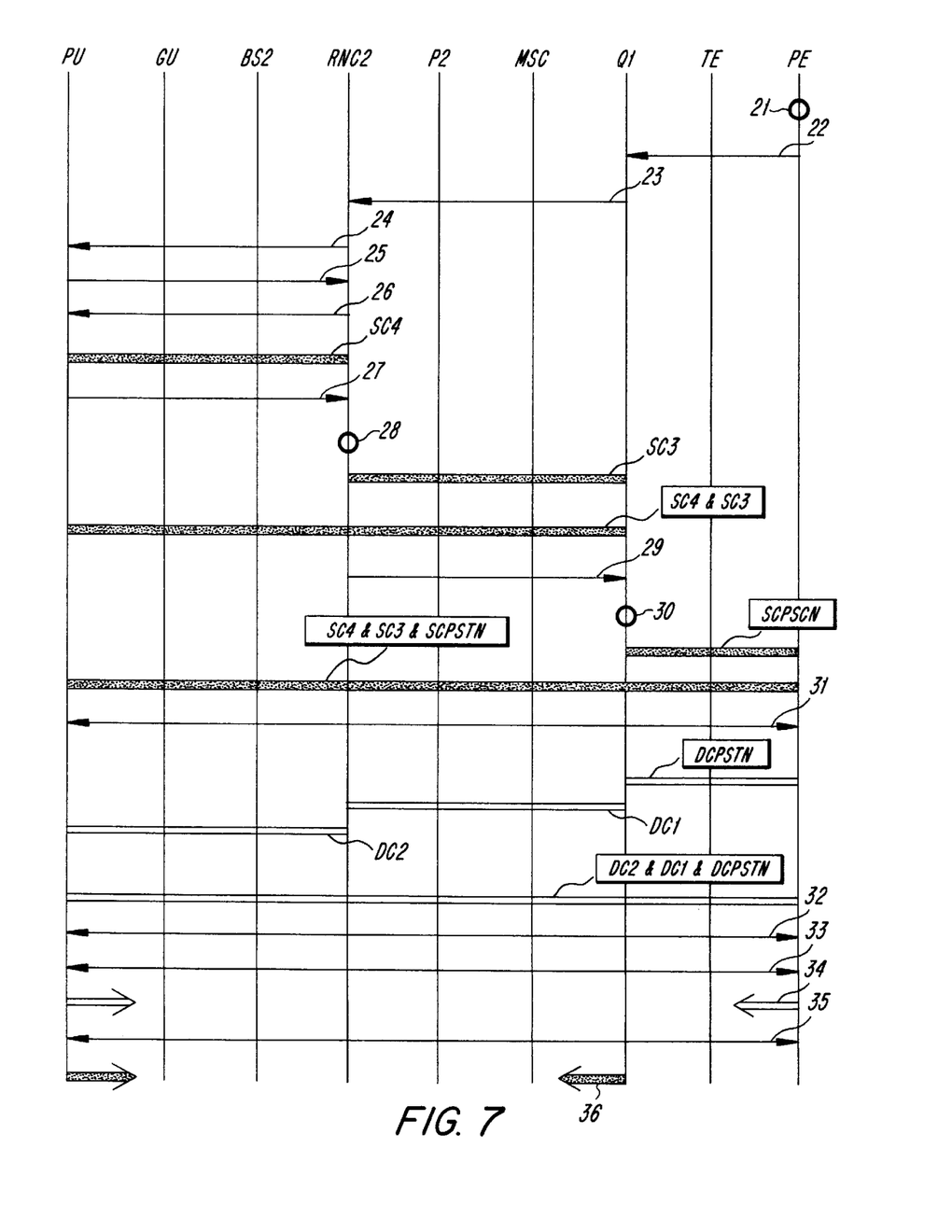
FIG. 7 illustrates the signalling effected when setting-up a call connection to another radio unit belonging to a PSTN-network and located in the access network.

The procedure when connecting a call between a user of a permanently connected telephone unit PE in the PSTN-network and a user of the PSTN-unit PU is shown in the access network ACC in FIG. 7. FIG. 7 shall be studied together with FIG. 4. The method does not claim to illustrate the full signalling procedure that is followed in the various method steps. The method includes the following steps:

The A-subscriber using the permanently connected telephone unit PE in the PSTN-network requests a call connection to the PSTN-unit PU in the access network ACC, by giving the telephone number, a so-called B-number, of the PSTN-unit PU. This request has been shown in the Figure with a round ring 21.

The B-number is analyzed in the first local exchange LE1. The first local exchanger LE1 finds that the B-number points to a subscriber who is not found in the local exchange LE1 and forwards the call request to the transit exchange TE, which also analyzes the B-number and finds that the B-number points to a subscriber in the second local exchange LE2. The call is forwarded to the second local exchange LE2. In its analysis, the second local exchange LE2 finds that the subscriber concerned is connected to port Q1. The port Q1 constitutes a so-called V5.1 interface (see ETSI standard ETS 300 324-1 February 1994) against the second local exchange LE2. The second local exchange LE2 sends a call connection request to port Q1, there being pointed out a port number which represents the subscriber in the V5.1 interface. The call connection request is translated to a paging request in the input port Q1. The paging request includes the identity of the PSTN-unit PU. The method step has been shown with an arrow 22 in FIG. 7.

The paging request is forwarded from the input port Q1 to the radio control unit RNC2, as shown in FIG. 7 with an arrow 23.

A paging message 24 is sent from the radio control unit RNC2 to all base stations BS2 in whose cells the PSTN-unit PU can or may be located. In the present case, the paging message is sent to the seven base stations in which the PSTN-unit may be located. The message 23 includes information required for the PSTN-unit to request a free channel. Examples of such information are port identity, channel description or necessary power for access to the access network ACC.

A channel request message 25 is sent from the PSTN-unit PU to the radio control unit RNC2 via the base station BS2. The message includes a request for a channel that is dedicated especially to signalling between the PSTN-uni PU and the base station BS2.

An accept message 26 is sent from the radio control unit RNC2 to the PSTN-unit PU. The accept message 26 points out a dedicated channel from possible available channels.

A fourth signal carrier SC4 is established by virtue of the dedicated channel being especially allocated signalling between the PSTN-unit PU and the base station BS2. The signal carrier SC4 remains established until its release is requested.

An access message 27 is sent from the PSTN-unit PU to the radio control unit RNC2 via the fourth signal carrier SC4. The access message 27 includes a subscriber identity AI which indicates the user of the PSTN-unit. The access message 27 also includes a first service network identity which points out the PSTN-service network as the home network of the present user.

The access message 27 is analyzed in the radio control unit RNC2 and the port Q1 is pointed out as the input port to the PSTN-home network. This has been marked in the Figure with a round ring 28.

A third signal carrier SC3 is established. The third signal carrier SC3 remains established until its release is requested.

The two established signal carriers SC3 and SC4 are inter-connected. This interconnection enables messages from the fourth signal carrier SC4 to be delivered continuously to the third signal carrier SC3, and vice versa, provided that both signal carriers are established. The third and the fourth signal carriers SC3 and SC4 therewith form a common signal carrier designated SC4&SC3 in the Figure.

The subscriber identity AI is forwarded from the radio control unit RNC2 to the input port Q1 via the third signal carrier SC3, as indicated by arrow 29.

The subscriber identity AI is analyzed in the input port Q1 and the input port identifies the original call connection request from the second local exchange LE2. This has been marked with a round ring 30 in the Figure.

The PSTN-signal carrier SCPSTN is established in accordance with the transport system used in the home network. The PSTN-signal request SCPSTN remains established until its release is requested.

The established signal carriers SC3&SC4 and SCPSTN are interconnected. This interconnection of the signal carriers enables messages from the PSTN-signal carrier SCPSTN in the PSTN-network to be delivered continuously to the signal carriers SC3&SC4 in the access network, and vice versa, provided that the signal carriers are established. The third signal carrier SC3, the fourth signal carrier SC4 and the PSTN-signal carrier SCPSTN therewith form a common signal carrier designated SC4&SC3&SCPPSTN in the Figure.

Signalling necessary for establishing a call connection is sent in both directions over the signal carriers SC3, SC4 and SCPSTN between the PSTN-unit PU and the home network PSTN, as shown by arrow 31. Signalling is effected in accordance with the specified standard of the home network PSTN. The signalling includes the request for connection of data transfer links between the two users of the telephone units PE and PU, the A-subscriber and the B-subscriber, wherein the transmission rate or speed is selected in accordance with the transmission rate of the PSTN-home network. Because the transmission of audio data is intended, a narrow band carrier service is chosen.

A PSTN-data transfer link DCPSTN is connected through the PSTN-network between the permanently connected telephone unit PE and the input port Q1. Data transfer links are marked in FIG. 7 with broad hollow lines.

A first data transfer link DC1 is connected through the ATM-network between the input port Q1 and the radio control unit RNC2, in accordance with the aforesaid ATM-specification.

A second data transfer link DC2 is connected through the ATM-network and the CDMA-network between the radio control unit RNC2 and the PSTN-unit PU.

The data transfer links are interconnected. This interconnection of the links enables data from the PSTN-data transfer carrier DCPSTN in the PSTN-network to be delivered continuously to the data transfer carriers DC1 and DC2 in the access network ACC, and vice versa, provided that the signal carriers are established. The various data transfer carriers therewith form a common carrier designated DC2&DC1&DCPSTN in the Figure.

Speech data is transferred 32 between the A-subscriber and the B-subscriber, i.e. between the permanently connected telephone unit PE and the PSTN-unit PU, via the common data transfer carrier DC2&DC1&DCPSTN.

The request 33 for release of the data carriers DC2&DC1&DCPSTN when the call is terminated.

The data transfer links are released. This release has been marked with two broad arrows 34 in FIG. 7.

The request 35 for release of the signal carriers SC4&SC3&SCPSTN in conjunction with terminating the signalling.

The established signal carriers SC3, SC¤ and SCPSTN are released. This release has been shown in FIG. 7 by two broad solid arrows 36.

Figure 8:
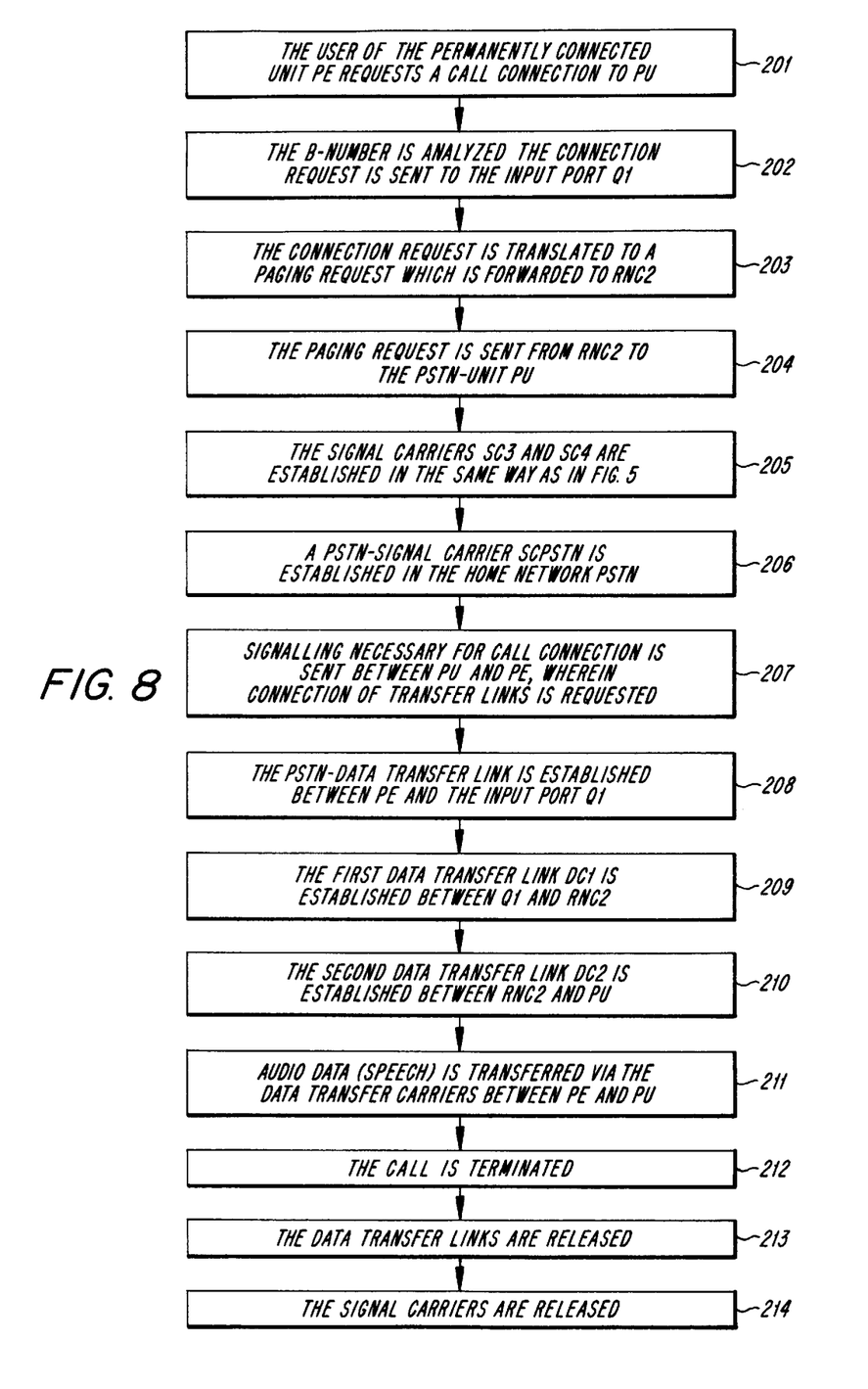
FIG. 8 is a flow sheet illustrating the signalling procedure shown in FIG. 7.

FIG. 8 is a flow sheet which briefly describes the most important steps in the earlier described method. FIG. 8 shall be read together with FIGS. 4, 5, 6 and 7. The flow sheet in FIG. 8 includes the following steps:

The A-subscriber using the permanently connected telephone unit PE in the PSTN-network requests a call connection to the PSTN-unit PU in the access network ACC, by giving the telephone number, the so-called B-number of the PSTN-unit PU. This request is shown in the Figure with a block 201.

The B-number is analyzed. In its analysis, the second local station LE2 finds that the subscriber concerned is connected to port Q1, in accordance with block 202.

The request is translated in the input port Q1 to a paging request which is forwarded from the input port Q1 to the radio control unit RNC2, in accordance with block 203 in FIG. 8.

Paging message 24 is sent from the radio control unit RNC2 to all base stations BS2 in whose cells the PSTN-unit PU may or can be located, in accordance with block 204.

The fourth signal carrier SC4 and the third signal carrier SC3 are established in the same way as the second signal carrier SC2 and the first signal carrier SC1 were established in the earlier example. The establishment of the second and the first signal carrier is shown in FIGS. 5 and 6. This establishment has been marked with a block 205 in FIG. 8.

The PSTN-signal carrier SCPSTN is established or setup in accordance with the transport system used in the home network, in accordance with block 206.

Signalling necessary for setting up a call connection is sent in both directions over the signal carriers SC3, SC4 and SCPSTN, between the PSTN-unit PU and the permanently connected telephone unit PE in the home network PSTN, in accordance with block 207. Signalling takes place in accordance with the specified standard of the home network PSTN. The signalling includes the request for the connection of data transfer links between the two users of telephone units PE and PU, the A-subscriber and B-subscriber, the transfer rate being chosen in accordance with the transfer rate of the PSTN-home network.

The PSTN-data transfer link DCPSTN is established through the PSTN-network, between the permanently connected telephone unit PE and the input port Q1, in accordance with block 208.

The first data transfer link DC1 is established through the ATM-network, between the input port Q1 and the radio control unit RNC2, in accordance with block 209.

The second data transfer link DC2 is established through the ATM-network and the CDMA-network, between the radio control unit RNC2 and the PSTN-unit PU, in accordance with block 210.

Audio data is transferred 32 between the A-subscriber and the B-subscriber, i.e. between the permanently connected telephone unit PE and the PSTN-unit PU, via the common data transfer carrier DC2&DC1&DCPSTN, in accordance with block 211.

The request 33 for release of the data carriers DC2, DC1 and DCPSTN after the call has ended, in accordance with block 212.

The data transfer links are released. This release is shown in FIG. 8 with a block 213.

The established signal carriers SC3, SC4 and SCPSTN are released. This release is shown in FIG. 8 with a block 214.

As before mentioned, several variants of the afore-described and illustrated methods are conceivable. For instance, it is conceivable that a subscriber located within the cell area of a radio control unit in the access network is registered as belonging to a surface network which is handled by an Operator or Proprietor different to those Operators that handle the service networks that are connected to the radio control unit. In this case, the procedure may be preceded by storing in the radio control unit information concerning cooperative relationships that exist between different Operators and when, receiving a service network identity which includes an Operator unknown to the radio control unit, designating another Operator with which cooperative relationships are found. In the case when no cooperative relationships exist, an Operator of a service network of the same specified network type as the network handled by the Operator disclosed by the service network identity is designated either randomly or in accordance with a predetermined ranking list.

Other modifications are also conceivable. For instance, information necessary for an Operator of the access network to bill Operators of respective home networks for the use of the access network can be stored in conjunction with pointing-out the home networks GSM or PSTN. Further signalling examples are disclosed in Swedish Patent Application No. 9404285-0 filed by LM Ericsson 941207. This application illustrates the case in which a mobile telephone unit that is located in a mobile telephone network (corresponding to the access nework ACC) belongs to a ground based telephone network (corresponding to a home network). The Swedish application discloses how the mobile telephone unit is registered in the ground based network (the home network) and how call connections can be established and how movement of the mobile in the mobile telephone network (the access network) is handled. It will be understood that the afore-described and illustrated exemplifying embodiments of the invention can be modified and changed without departing from the concept of the invention. For instance, the radio interface in the access network may be satellite based, i.e. communication between a radio unit in the access network and a base station in the access network takes place via a satellite. Neither need the transmission of the radio signals take place with the aid of CDMA-techniques as in accordance with the embodiments. It is also conceivable that radio signals can be transmitted with the aid of TDMA-techniques (Time Division Multiple Access), FDMA-techniques (Frequency Division Multiple Access) or any other appropriate transmission technique. The signal carrier which transports standard signals transparently through the access network can be chosen from a number of possible types, as earlier mentioned and shown by example.

Naturally, several other types of service network with other signalling standards than those disclosed here are also conceivable. Other examples of network types are NMT, AMPS, TACS, PDC. Future types of network are also conceivable, for instance data game networks GOD (Game On Demand) used, for instance, by a data game agency which transports data game signals to the data game equipment of person renting the game against payment.

Several variants in the configuration of the access network are also conceivable without departing from the concept of the invention. For instance, it is conceivable to bar access to certain service networks from certain parts of the access network. It is also conceivable for radio control units and ports to be located in one and the same place and to belong to one and the same hardware unit in certain cases. Other examples of variants include separate access networks and transport networks instead of common networks with regard to hardware illustrated above and referred to in the text as a universal network.

It will therefore be understood that the present invention is not restricted to the aforedescribed and illustrated exemplifying embodiments thereof and that modifications can be made within the scope of the following claims.

What is claimed is:

1. A telecommunications system for extending the range of at least two service networks having mutually different specified signaling standards, wherein the telecommunications system includes a radio-based access network which includes at least one port to each service network, wherein the ports are connected to at least one base station in the access network, wherein the access network also includes a radio-based access network part which can connect the at least one base station to a radio unit in the access network, wherein the radio unit is registered as belonging in a home network associated with one of the service networks, wherein a signal carrier in the access network has a first terminal point in the radio unit and a second terminal point in a port that connects the access network with the home network, and wherein the port functions to combine the signal carrier in the access network with a signal carrier in the home network.

2. A telecommunications system according to claim 1, wherein the telecommunications system includes a radio-based data transport network, wherein the transport network is connected to the port and to the base station, wherein the transport network includes a radio-based transport network part which can connect the base station to the radio unit, wherein the radio unit forms a first terminal point for a transparent data carrier through the transport network, wherein the port forms a second terminal point for the data carrier through the transport network and wherein the port functions to combine the data carrier in the transport network with a data carrier in the home network.

3. A telecommunications system according to claim 1, wherein the radio unit includes an access network which forms the first terminal point for the signal carrier in the access network, wherein the radio unit also includes a service unit which functions to transmit and receive signals over the signal carrier in the access network with the same specified signalling standard as a signalling standard specified in the home network.

4. A telecommunications system according to claim 3, wherein the access unit also forms the first terminal point for the data carrier in the transport network, and wherein the service unit functions to transmit and receive data over the data carrier in the transport network at the same data transmission rate as the data transmission rate specified in the home network.

5. A telecommunications system according to claim 1, wherein the port includes a first signalling node which borders on the access network and a second signalling node which borders on the home network, wherein the first signalling node forms the second terminal point for the signal carrier through the access network, and wherein the second signalling node forms a terminal point for the signal carrier through the home network, and wherein the nodes use the same specified signalling standards as those used in the network on which respective nodes border.

6. A telecommunications system according to claim 5, wherein the port includes a transfer unit which functions to transfer signals having home network standard from the signal carrier in the access network to the signal carrier in the home network, and wherein the transfer unit functions to transfer signals with home network standards from the signal carrier in the home network to the signal carrier in the access network.

7. A telecommunications system according to claim 5, wherein the port includes a transfer unit which functions to transfer signals with home network transmission rates from the data carrier in the transport network to the signal carrier in the home network, and wherein the transfer unit functions to transfer signals with home network transmission rates from the signal carrier in the home network to the signal carrier in the access network.

8. A method relating to a telecommunications system for extending the range of at least two service networks having different specified signaling standards, wherein the method comprises the steps of:

connecting at least one input port to each of the service networks;

connecting a radio-based access network to the input ports; and connecting at least one base station in the access network to the input ports, wherein the at least one base station is able to establish a radio connection to at least two radio units in the access network, and wherein each of the radio units is registered as belonging to a home network associated with one of the service networks.

9. A method relating to a telecommunications system according to claim 8, wherein the access network includes a radio control unit which is connected between the base station and the input ports, wherein the method comprises the further steps of:

storing in the radio control unit information disclosing service networks that border on the ports;

sending from a radio unit to the radio control unit a service network identity corresponding to the home network of the radio unit; and pointing out the input port of the home network in the radio control unit.

10. A method relating to a telecommunications system according to claim 8, wherein the method comprises the further steps of:

establishing a signal carrier between the radio unit and the input port of the home network; and combining the signal carrier in the access network with a signal carrier in the home network.

11. A method relating to a telecommunications system according to claim 10, wherein the method comprises the further step of:

transferring signals between the radio unit and the home network over the signal carrier in the access network, said signals being of the same specified standard as the standard specified within the home network.

12. A method relating to a telecommunications system according to claim 8, wherein the method comprises the steps of:

connecting a transport network to the input ports;

connecting the transport network to the base station and to the radio unit;

establishing a data carrier in the transport network between the radio unit and the input port;

combining the data carrier in the transport network with a data carrier in the home network.

13. A method relating to a telecommunications system according to claim 8, wherein the method comprises the further step of:

sending data between the radio unit and the home network over the data carriers, said data being transmitted at the same transmission rate as the transmission rate specified in the home network.

14. A method relating to a telecommunications system for extending the range of at least two service networks having different specified signalling standards, wherein the method comprises the steps of:

connecting at least one input port to each of the service networks;

connecting a radio-based access network to the input port; and connecting at least one base station in the access network to the input ports, wherein the base station can establish a radio connection to a radio unit in the access network, and wherein the radio unit is registered as belonging in a telephone network which is of the same standard type as one of the service networks, this telephone network being designated the home network of the radio unit.

15. A method relating to a telecommunications system according to claim 14, wherein the access network includes a radio control unit which is connected between the base station and the input ports, wherein the method comprises the further steps of:

storing in the radio control unit information disclosing those service networks that border on the ports;

sending from the radio unit to the radio control unit a service network identity corresponding to the home network of the radio unit; and in the radio control unit, designating an input port to a service network whose specified standard is the same as the standard of the home network.

16. A method relating to a telecommunications system according to claim 14, wherein the access network includes a radio control unit which is connected between the base station and the input ports wherein the method includes the further steps of:

storing in the radio control unit information disclosing those service networks that border on the ports, and storing information disclosing cooperative relationships between Operators of the service networks and Operators of other networks;

sending a service network identity corresponding to the home network of the radio unit from said radio unit to the radio control unit; and in the radio control unit, designating an input port of a service network with which cooperative relationships are found and whose specified standard is the same as the standard of the home network.

17. A method relating to a telecommunications system according to claim 14, said method comprising the steps of:

establishing a signal carrier between the radio unit and the designated input port of the service networks; and combining the signal carrier in the access network with a signal carrier in the service network.

18. A method relating to a telecommunications system according to claim 17, wherein the method comprises the further step of:

transferring signals between the radio unit and the service network having the designated input port, said signals being of the same specified standard as the standard specified within the service network that is pointed out.

19. A method relating to a telecommunications system according to claim 14, wherein the method comprises the steps of:

connecting a transport network to the input ports;

connecting the transport network to the base station and to the radio unit;

establishing a data carrier in the transport network between the radio unit and the input port;

combining the data carrier in the transport network with a data carrier in the home network.

20. A method relating to a telecommunications system according to claim 14, wherein the method comprises the further step of:

sending data between the radio unit and the home network over the data carriers, said data being transmitted at the same transmission rate as the transmission rate specified in the home network.

21. A telephone network comprising a radio-based access network and at least two service networks having different specified standards, wherein the access network includes at least one port to each service net, wherein the ports are connected to at least one base station in the access network, wherein the access network also includes a radio-based access network part capable of connecting the at least one base station to a radio unit in the access network, wherein the radio unit is registered as belonging to one of the service networks, the so-called home network of the radio unit, wherein a signal carrier in the access network has a first terminal point in the radio unit and a second terminal point in the port which connects the access network with the home network, and wherein the port functions to combine the signal carrier in the access network with a signal carrier in the home network.

22. A radio unit in an access network which is connected to at least two service networks having different specified standards, wherein the radio unit is registered as belonging to one of the service networks, said service networks being designated as the home unit of the radio unit, wherein the radio network includes an access unit which functions to maintain a radio connection with a base station in the access network, and wherein the radio unit also includes a service unit which functions to transmit and receive, via the radio connection, signals having the same specified signal standard as a standard specified in the home network.

23. A radio unit according to claim 22, wherein the service unit also functions to transmit and receive data signals having the same data transmission rate as a transmission rate specified in the home network.

* * * * *